April 13, 1926.

H. FOX 1,581,049

GRAIN SHOCKER

Filed Feb. 24, 1922

Inventor.
Herbert Fox
by H. J. S. Dennison
Atty.

April 13, 1926.

H. FOX 1,581,049

GRAIN SHOCKER

Filed Feb. 24, 1922

Inventor.
Herbert Fox

April 13, 1926.

H. FOX

GRAIN SHOCKER

Filed Feb. 24, 1922

Inventor.
Herbert Fox.
by H.J.S. Dennison
Atty.

Inventor.
Herbert Fox

Patented Apr. 13, 1926.

1,581,049

UNITED STATES PATENT OFFICE.

HERBERT FOX, OF HAMILTON, ONTARIO, CANADA.

GRAIN SHOCKER.

Application filed February 24, 1922. Serial No. 538,998.

*To all whom it may concern:*

Be it known that I, HERBERT FOX, a subject of the King of Great Britain, and resident of the city of Hamilton, county of Wentworth, Province of Ontario, in the Dominion of Canada, have invented certain new and useful Improvements in Grain Shockers, described in the following specification and illustrated in the accompanying drawings, that form part of the same.

The objects of the invention are to facilitate the work of harvesting grain, enabling crops to be garnered in shorter time and at less expense and to devise a shocker of extremely light but durable construction which may be manufactured at a cost which will permit of universal use.

A still further object is to devise a machine which may be readily handled with the ordinary horse or tractor power required in operating binders and further, to devise a construction of machine which is light and flexible and will not hamper the operation of the binder.

The principal features of the invention consist in the novel construction and arrangement of parts whereby the sheaves are taken from the binder deck and turned butt downward and deposited on a reciving member by a swinging gripper member and said sheaves are uniformly packed into a bundle or shock by horizontally operating packer members and when the bulk of the shock reaches the desired dimensions, the receiving member operates to deposit the shock butts down upon the ground in a compact bundle which will stand effectively.

In the drawings Fig. 1ª is a plan of the steering wheel.

The main frame of the shocker is formed of a pair of angle bars 1 secured together at one end and arranged at an acute angle, the other end being connected to bracket members 2 in which are supported the axle members 3 and 4 upon which are mounted the wheels 5 and 6 respectively. A cross bar 7 is rigidly connected with the bars 1 forward of the wheels, thus forming a rigid frame. A bar 8 is rigidly secured to the angle bars 1 adjacent to the forward end and extends to the inward side of the frame, that is, toward the binder. This bar is braced by a brace rod 9 and the outer end is pivotally connected to a strut extension 10 from the binder which is not herein shown. The frame is drawn along with the binder by means of this connection.

Figure 1:
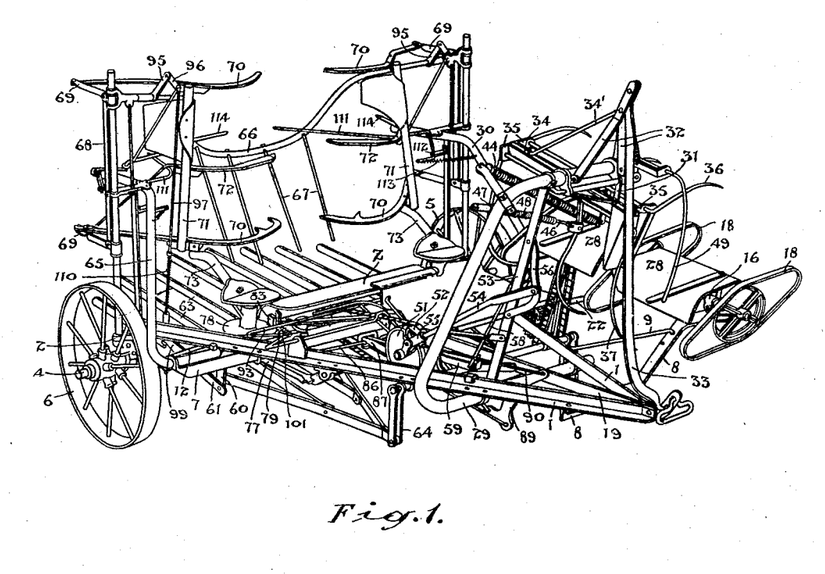
Figure 1 is a perspective view of a shocker from the front and outer side with the sheaf gripper in position to receive the sheaves from the binder.

The inside axle member 3 extends well beyond the hub of the wheel 5 and a trussed bar 11 (see Fig. 1ª) is pivotally mounted thereon. One end of the trussed bar extends downwardly and is twisted to form a spade which is adapted to dig into the ground under certain conditions. The other end extends over the upper side of the wheel and to it is pivotally connected the tie bar 12 which is connected to the rear of the binder frame. The axles 3 and 4 are bent upwardly and the vertical portions pivot in the brackets 2 which are notched in the under side to rest on the shouldered portions of the axles holding them in position to hold the wheels straight. The upper end of the trussed bar 11 normally extends to the forward side of the inside wheel. A rod 12', Figs. 2 and 5 connects the inside and outside axles so that they will pivot in unison. In the event of the binder backing up the spade end of the bar 11 digs into the ground and throws the upper end connected to the tie bar 12 to the rear of the pivot of the wheel, and the wheels then follow the backward movement of the binder freely. The shocker thus follows automatically the movements of the binder.

An arm 13 is supported at the inward or binder side of the frame and is formed with an angled upper end 14 which supports a pair of journals 15. A corresponding journal 16 is secured to the upper end of the traction bar 8 and in these journals is mounted a shaft 17. Upon each end and in the centre of the shaft 17 are secured the elliptical shaped sheaf carriers 18 which are adapted to receive the sheaves delivered from the deck of the binder and, as the shaft supporting said carriers is constantly rotated so that the carriers turn toward the shocker frame, the sheaves are passed outwardly.

Figure 2:
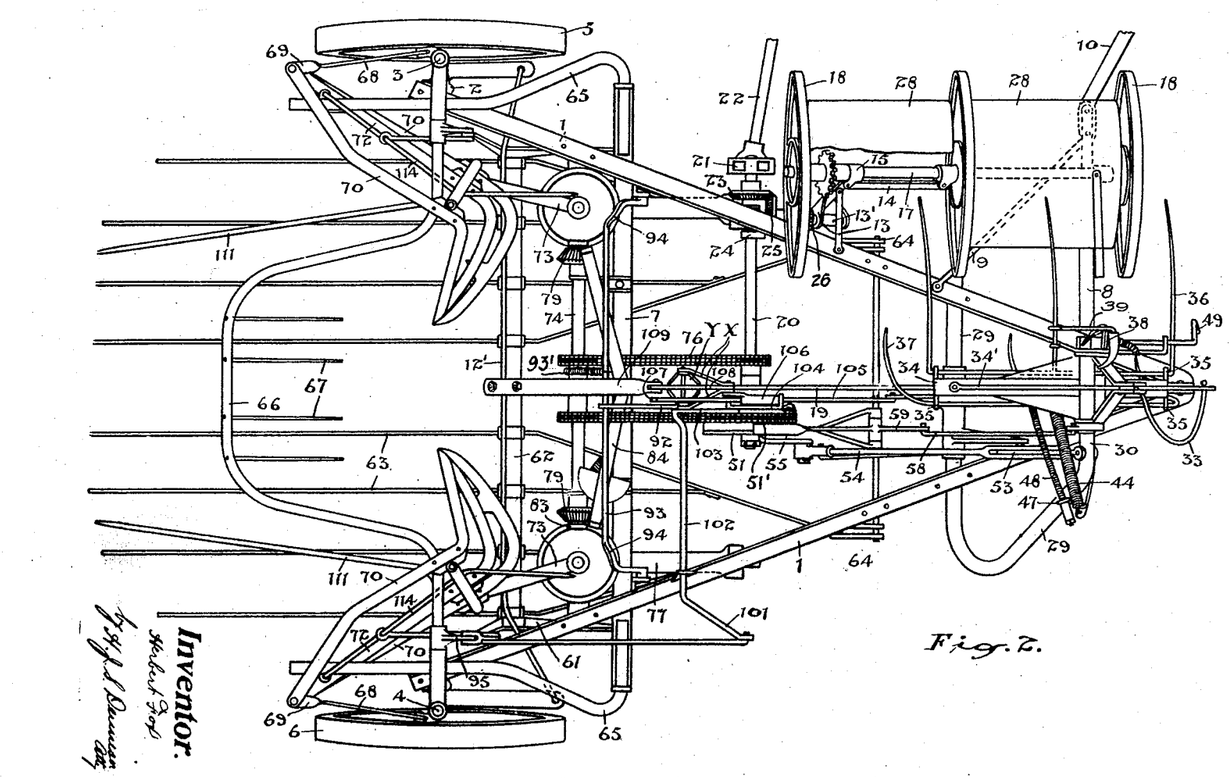
Figure 2 is an enlarged plan view of the parts substantially in the position shown in Figure 1.
Figure 5:
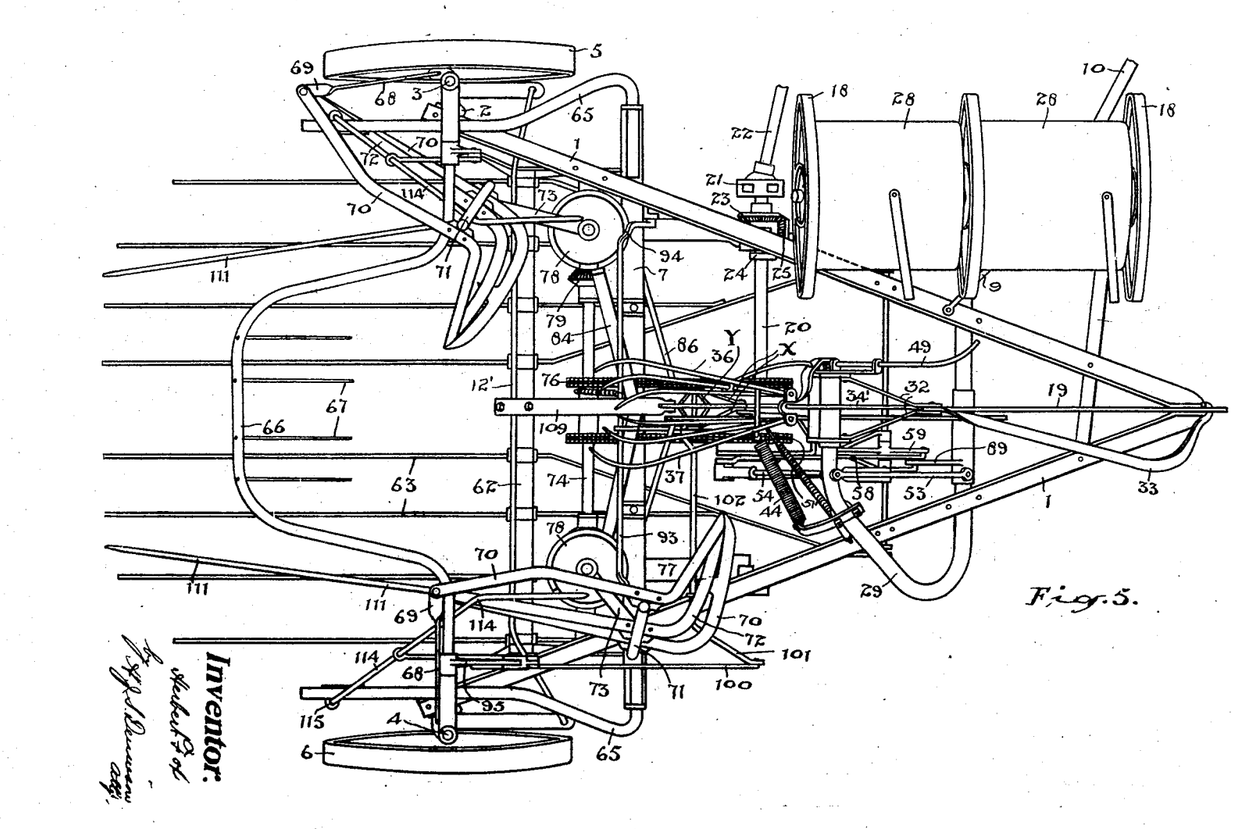
Figure 5 is a plan view showing the sheaf gripper in the rearward position as delivering the sheaf to the shock former.

The triangular shaped frame is divided centrally by a longitudinal bar 19 which extends from the apex of the angle bars 1 to the rigid cross bar 7, Figs. 2 and 5. The main driving shaft 20 of the shocker machine is supported in bearings carried by the centre bar 19 and inner bar 1 and it is connected by a toggle joint 21 and shaft 22 with the mechanism of the binder.

A bevel gear 23 is mounted on the shaft 20 and a yoke 24 supported on said shaft 20 is formed with a stud projection upon which is mounted a bevel gear 25 meshing with the gear 23. A sprocket wheel 26 forms part of the gear 25 and is connected by a chain 27 to a sprocket wheel on the shaft 17 so that the elliptical sheaf carriers operate constantly during the movement of the binder. The arm 13 supporting the shaft 17 is formed with a sleeve end 13' which fits over the stud projection of the yoke 24, consequently the sprockets will be always maintained in alignment. Shields 28 in the form of sheet metal members are rigidly supported above the shaft 17 between the elliptical sheaf carriers to prevent loose straw from fouling between said carriers.

A tubular bar 29 is rotatably supported in bearing brackets secured to the main frame of the machine about opposite the central elliptical sheaf carrier. This bar is bent upwardly at substantially a right angle and its upper end 30 is turned inwardly towards the binder parallel with the lower portion forming a bail. Pivotally suspended upon the upper end 30 of the bar 29 is a V-shaped bracket 31 and to the upper ends of this bracket are secured a pair of bars 32 which extend upwardly and converge towards each other, being connected together at the top and between the upper ends of these bars is pivotally secured the upper end of a tie bar 33, the lower end of which is pivoted to the front end of the main frame.

A bar 34 is rigidly secured to the bracket 31 and extends forwardly and rearwardly of the supporting member 30, the rear end being rigidly connected with the bars 32 by a tie bar 34'. The bar 34 is formed with laterally turned pairs of lugs 35 at each end. In these paired lugs are mounted the gripper members 36 and 37, each preferably provided with three fingers which are curved so that the free ends of each set curve toward the other.

Figure 4:
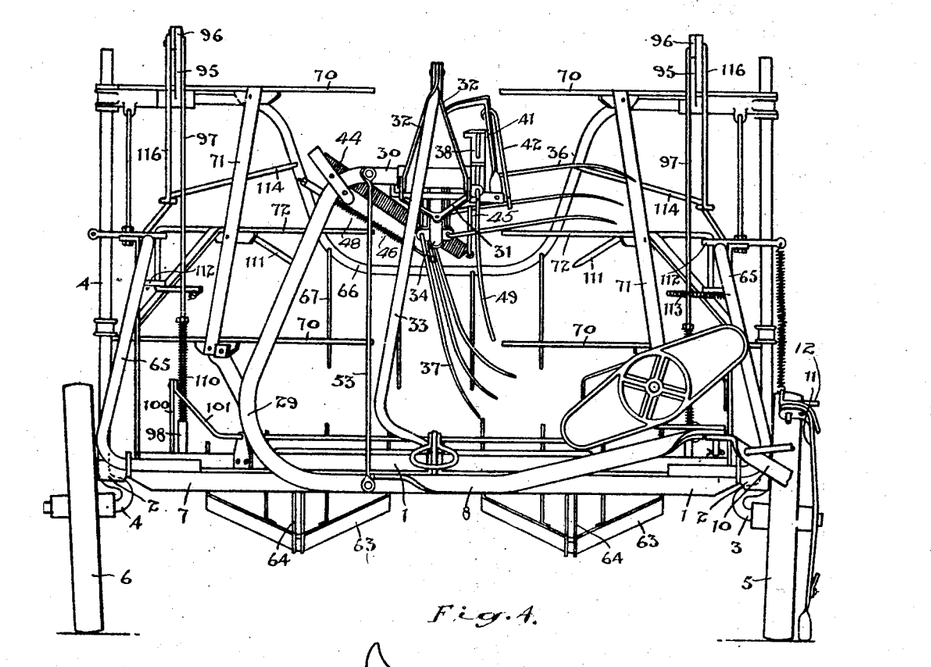
Figure 4 is a front elevational view of the machine with the parts substantially in the position shown in Figure 1.

A latch keeper 38 is rigidly connected with the bar 30 and extends upwardly therefrom at right angles having a rearwardly and outwardly curved spur 39. A trip shaft 40 arranged parallel with the sleeve 31 and supported in lugs projecting therefrom is provided with a pivotal latch arm 41 at the inner end which extends upwardly and engages the keeper 38. A link 42 pivotally connected to the latch arm 41 is provided with an eye 43 which slidably encircles the middle finger of the upper gripper member 36 and holds it in the raised position shown in Figures 1 and 4 with the latch arm engaging the keeper 38.

A coiled tension spring 44 connected at one end to the upright portion of the bail member 29 is connected at its other end to an arm 45 secured to the upper gripper 36 and exerts a constant pull to swing the gripper downwardly but it cannot do so while the latch arm 41 is in engagement with the keeper. To the central finger of the lower gripper member 37 is pivotally connected a rod 46 which slidably extends through an eye 47 secured on the upper elbow of the bail 29 and around this rod is arranged a coil compression spring 48.

When the gripper members are in their open position they are arranged to receive a sheaf passed outward by the rotating sheaf carriers 18 and the impact of the sheaf is received by the compression spring 48. The sheaf in its movement into the space between the grippers engages a trip arm 49 which is pivotally supported from the bail 30 and is provided with a spur end 50 which engages the latch arm 41 and pushes it out of engagement with the keeper 38.

The pull of the tension spring 44 then snaps the upper gripper against the sheaf so that it is gripped securely between the two gripper members.

The main drive shaft 20 supports a crank disc 51 which is operated by a clutch continuously operated by the chain 51' and controlled by a clutch dog 52. A bar 53 extends vertically between the upper and lower horizontal portions of the bail 30 and is arranged substantially in the same plane as the crank disc 51. A connecting rod 54 connects the crank arm 55 with a curved extension 56 of the bar 53 so that upon the rotation of the crank disc the connecting rod swings the bail rearwardly on its pivot, which is the tubular bar 29. As the bail swings rearwardly the sleeve 31 is rotated upon the upper end 30 through the connection of the tie bar 33 to the outer ends of the bars 32 thereby swinging the sleeve and the gripper members carried thereby from the substantially horizontal position shown in Figure 3 to the substantially vertical position shown in Figure 6. This action follows immediately upon the release of the latch arm 41 from the keeper 38, said latch arm rotating the trip shaft 40 immediately upon the release of the latch from engagement with the keeper.

The trip shaft 40 is provided with a cranked end 57 which is connected by a rod 58 to a pivotal arm 59 which normally engages the clutch dog holding it out of gear but which upon the tripping of the latch the arm 59 releases the clutch dog causing the clutch to operate the crank disc to swing the bail rearwardly.

It will be noted that the head of the sheaf is not brought into contact with any portion of the mechanism. As the body of the sheaf is gripped by the gripping members it is turned from the horizontal to a vertical position and it is ready to be delivered to the shock forming mechanism.

Figure 3:
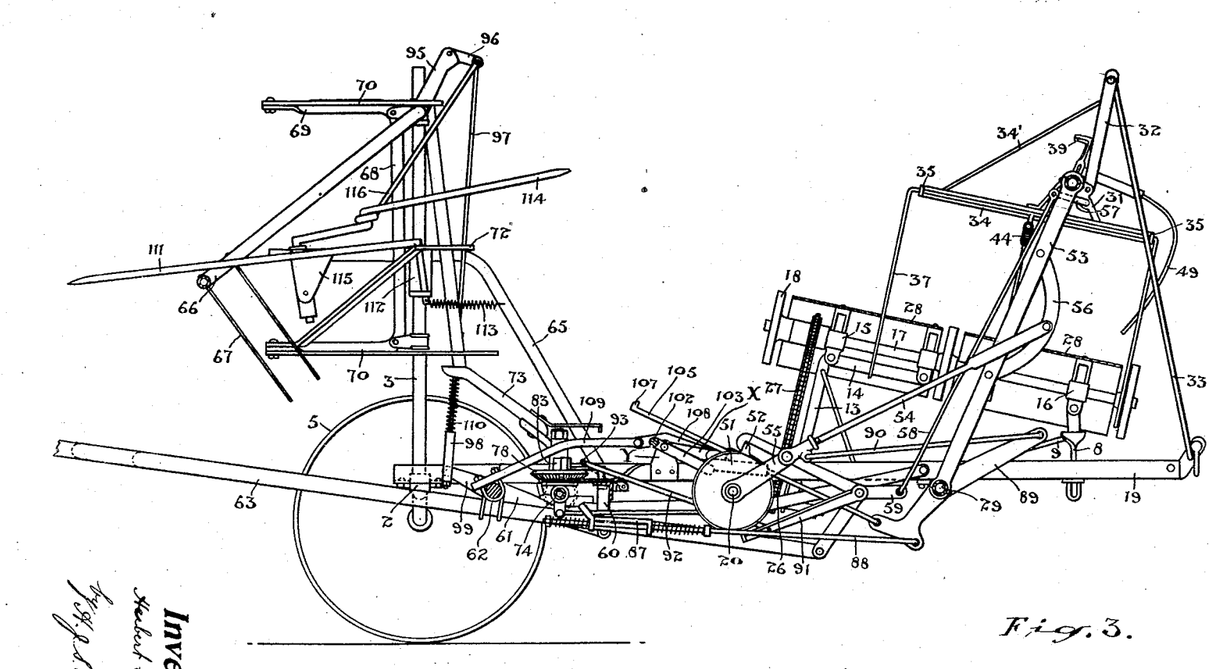
Figure 3 is an elevational part sectional view from the outer side of the shocker with the parts substantially in the position shown in Figure 1.
Figure 6:
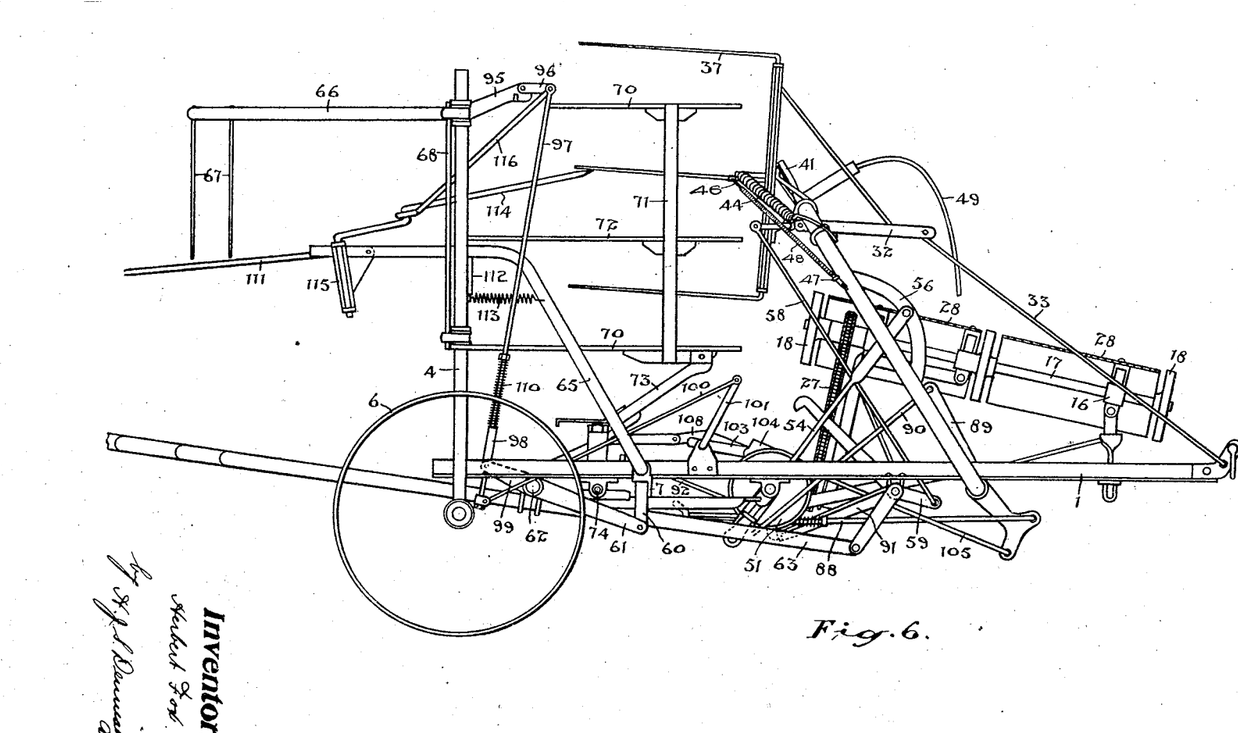
Figure 6 is an elevational view from the outside of the machine showing the parts in the position substantially as shown in Figure 5.
Figure 8:
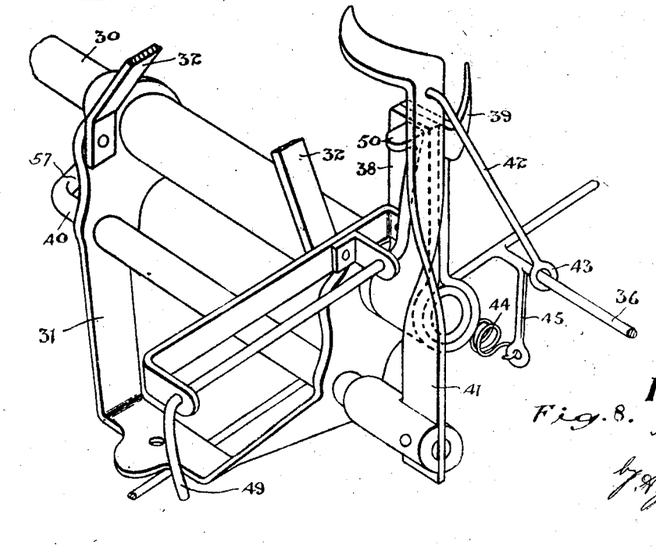
Figure 8 is an enlarged perspective detail of the sheaf gripper latch and trip mechanism.

Bracket members 60 are secured to and extend downwardly from the rigid cross bar 7 of the frame and to each of these is pivotally secured an arm 61 to which is connected the tubular cross bar 62 which forms the support for the skid bars 63 which receive the butt ends of the sheaves. These skid bars are connected to the tubular cross bar and extend forwardly, the front ends being converged and rigidly secured together in two sets the foremost ends being supported by the swinging links 64 supported from the main frame. The tubular cross bar is normally supported in a raised position as illustrated in Figures 3 and 6 by a mechanism which will be hereinafter explained.

The axle members 3 and 4 supporting the wheels extend vertically through the bracket members 2 and project upwardly a considerable height, being supported mid-way of their height by sleeve brackets carried by the bent bars 65 secured to the lateral ends of the cross bar 7.

A bail shaped tubular bar 66 is supported in bearings carried by the upright ends of the axle members 3 and 4, the central bent portion extending rearwardly and forming the upper back portion of the sheaf receptacle. A plurality of rods 67 are secured in the bail and extend angularly downward therefrom to support the sheaves.

A pair of U-shaped frame 68 are pivotally supported one upon each of the vertical axle members so that the end portions 69 may swing inward. Pivotally connected to the upper and lower portions 69 of the U-frames are the hook-shaped bars 70. These are connected by vertical spacers 71 and intermediately arranged hook-shaped bars 72 are secured to the spacers and the outer ends are bent downwardly and secured to the lower hook bars. These sets of hook bars are arranged each side of the machine and they are adapted to be operated to move forwardly and to swing inwardly and pull the sheaf from the gripper when said gripper is in the rearward position as illustrated in Figure 6. The hook members then carry the sheaf rearwardly with the butt engaging the skid bars. These members thus form the sheaf packers.

Figure 9:
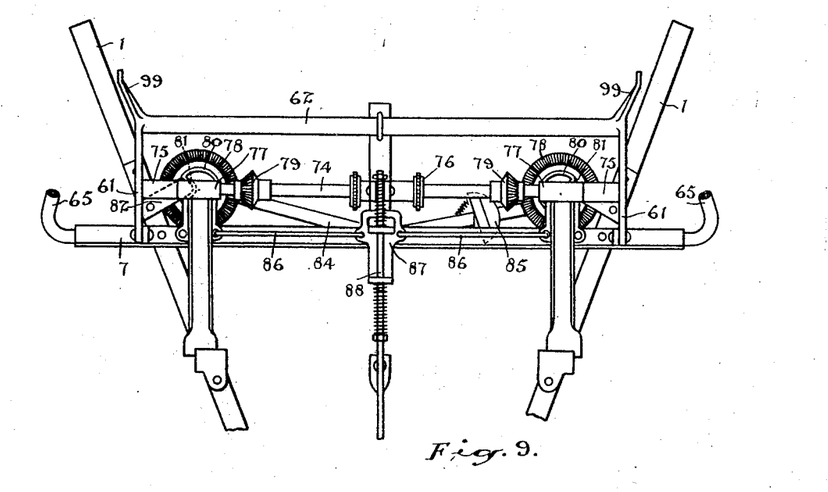
Figure 9 is an underside plan detail of the mechanism for operating the sheaf packer arms in the inoperative position.
Figure 10:
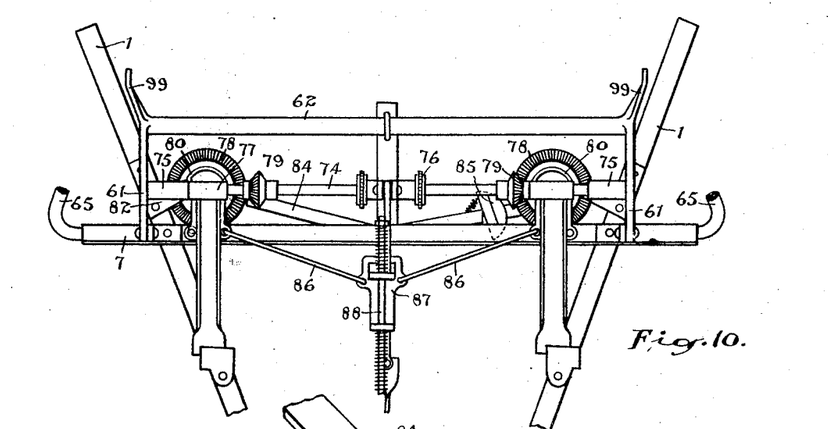
Figure 10 is a view similar to Fig. 9 showing the parts in the operative position.
Figure 11:
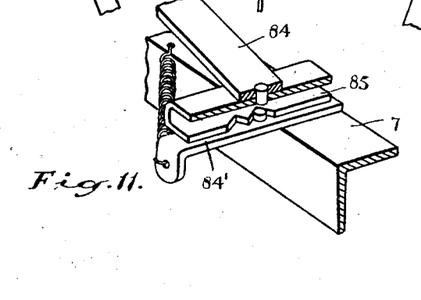
Figure 11 is an enlarged perspective detail of the latch for holding the gear shift device.

The means for operating the sheaf packers consists primarily of crank arms 73 mounted on vertically disposed axes arranged toward the sides of the frame. A shaft 74 is supported parallel with the cross bar 7 and to the rear thereof in bearings 75 arranged beneath the main frame as shown in Figures 9 and 10, and this shaft is constantly rotated by a sprocket chain connection 76 with the main drive shaft 20. Slidably arranged upon and near the ends of the shaft 74 are the bracket members 77 which carry vertical studs on which are rotatably mounted the bevel gears 78 to which the crank arms 73 are connected. Bevel pinions 79 are rigidly secured upon the shaft 74 near each end and are adapted to mesh with the gears 78 when said gears are moved into contact therewith by the sliding of the bracket members 77.

The sheaf packers are operated alternately and it is desired that when either one of said packers is operating the other will be rigidly held from movement. In order to ensure this the underside of each of the bevel gears is provided with a circular flange 80 which is formed with a recess 81, which when the gear is in the outward position as illustrated in the left hand side of Figure 9, receives the end of a rigid strut 82 and thus locks the gear securely from rotation. On the upper side each gear is provided with a lug projection 83.

Pivotally mounted upon the cross bar 7 is a bent bar 84, the ends of which are adapted to engage the lug projections of the bevel gears 78, said bar being so arranged that when one end thereof engages the lug projection of one gear to prevent the gear from being shifted inwardly to mesh with its pinion, the other end will be free of the lug on the other gear thus allowing it to be moved inwardly into mesh with its operating pinion. The swinging of the bar 84 reverses the conditions.

A member 85 is secured to the bar 84 and is notched to engage a pin on the swinging latch 84' carried on the bar 7 to hold the bar 84 in either one of its adjusted positions.

The position of the bent bar 84 is regulated by the lug projections 83 for when one end of the said bar is so arranged as to obstruct the lateral movement of one of the gears, the other end will overlap the path of movement of the lug of the other gear so that as the unobstructed gear rotates the lug will strike the bent bar and swing it on its pivot to clear the other gear before the operating gear moves out of mesh and instantly as the operating gear moves out of mesh the lug thereon moves into line with the obstructing bar.

The sliding bracket members 77 carrying the gears 78 are connected by link rods 86 to a yoke 87 carried on a central floating rod 88, said rod extending through said yoke and having a compression spring at either side which permits the bar to move even though the operation of the gears is not completed thus allowing for variation in timing the operation of the various co-acting parts and rendering absolute accuracy unnecessary.

A bell crank lever 89 is pivotally mounted upon the tubular bar 29 between the bar 53 and the longitudinal centre bar of the frame. The upper end of this lever is connected by a rod 90 to the crank arm 55, which rod swings the lever on its pivot with the operation of the crank. The floating rod 88 is connected to the lower end of the lever 89 below its pivot so that as the upper end is swung backwardly the rod 88 is pulled forward thus pulling upon the yoke 87 and the link rods 86. This pull draws upon the slidable brackets 77 carrying the bevel gears 78 but as the bar 84 engages either one of the gears to prevent its lateral movement on the shaft 74 the other one will be operated and drawn into mesh with its corresponding pinion on the shaft and as said shaft is continuously operating the bevel gear 78 brought into mesh with the pinion immediately commences to rotate and the crank arm 73 carried thereby moves the relative packer outwardly and forwardly. This action occurs simultaneously with the backward movement of the sheaf carrying bail and the hooked ends of the packer are moved well forward of the ends of the sheaf gripper by the time said gripper is turned to the position illustrated in Figures 5 and 6. The rotation of the gear continuing swings the packer inwardly so that the hooked ends pass in front of the sheaf and the further continued movement pulls the sheaf from the gripper, carrying it backwardly on to the skids.

It is necessary to delay the operation of the sheaf gripper when it reaches its backward position and this is accomplished by arranging an arm 91 held in the path of the clutch dog 52 which releases the clutch and stops the movement of the crank arm when it is moved to its full rearward position. The arm 91 is held up to the clutch by a rod 92 connected to a cranked bar 93 extending across the frame above the cross bar 7. This cranked bar is formed with the crank portions 94 extending over the gears 78 into the path of movement of the lug projections 83 on the bevel gears 78 and the bar is held toward the gears by the spring 93' Fig. 2. When either one of the gears has rotated to move the packer to strip the sheaf from the gripper the lug projection on the gear engages the bevelled portion of the cranked bar and swings it forwardly on its pivot, pushing upon the rod 92 to throw the arm 91 clear of the clutch dog, thus causing the crank arm 55 to continue its operation and swing the bail carrying the sheaf gripper back to its forward position.

It will be noted that when the sheaf gripper is in the full forward position it is offset to the inward side of the machine, that is, close into the elliptical sheaf carriers but as the bail is swung backward the relation between the bail and the gripper carrying bar 34 alters and the rod 46 connected to the lower member 37 engages the eye 47 on the bail and pulls said lower member outwardly. The tension of the spring 44 causes the member 36 to follow the member 37 so that when the gripper has reached its farthest position backward it will be in central alignment with the frame as shown in Figure 5, placing the sheaves centrally for either packer.

The shock bail 66 pivotally supported from the vertical axle members forms a pocket to receive the sheaves and as these are deposited successively the pressure swings the bail upward on its pivot. Near each end of the bail 66 is connected a crank arm 95 and on the outer end of each of these crank arms, which extend upwardly, is a link 96 which engages a lug on the crank arm below the link, said link being normally held in a substantially right angular position with the crank. Rods 97 extend downwardly from the ends of the links 96 and the lower ends slide in sleeve members 98 pivotally secured to the rearwardly extending portions 99 of the pivotal arms 61 supporting the tubular cross bar 62 which carries the skids. To the lower end of the outer rod 97 is pivotally secured the rod 100 which extends forwardly and is connected to the cranked end 101 of a rod 102 which is pivotally supported transversely of the frame forwardly of the cross bar 7. The inner end of the rod 102 is provided with a crank end 103 which extends forwardly and is pivotally connected to a U-shaped yoke 104. A rod 105 is pivotally connected to the lower end of the lever 89 and slides loosely through a hole in the forward end of the U-shaped yoke 104. A sleeve 106 encircles the rod 105 rearwardly of the yoke end and said sleeve is of shorter length than the distance between the yoke ends. The rear end of the rod 105 is provided with a stop lug 107 which is adapted to engage the end of the sleeve 106.

A pair of links x are pivoted to the rear end of the yoke 104 and are connected at their other ends to a cross bolt in the rigid brackets Y supported on the bar 19. An elbow-shaped link 108 is also pivotally connected to the rear end of the yoke 104 and extends over the pivot bolt of the links and thus forms a lock joint. An elbowed bar 109 is pivotally secured to the rear end of link 108 and is rigidly secured to the skid bar 62. A sheet metal guard Z is secured to the bar 109 and covers the gear mechanism for operating the packers but when the bar 109 is moved backwardly and the skids are dropped it assists in clearing the butts of the grain from the transverse parts of the structure.

Figures 1A, 7:
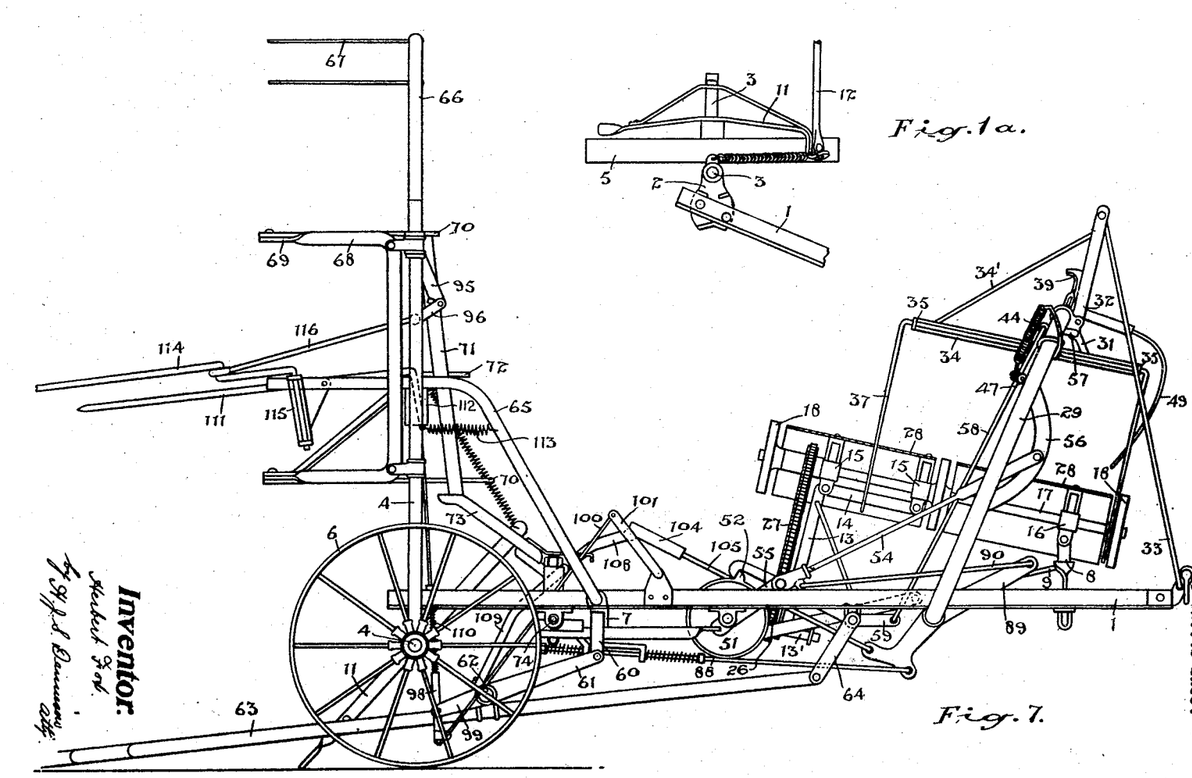
Figure 7 is a side elevational view from the outer side showing the parts in the postion of delivering the sheaf.

As the sheaves are packed upon the skids and their bulk increases the bail swings upward and the crank arms 95 swing forwardly, pushing downwardly upon the rods 97 against coil compression springs 110. The lock joint formed by links x and 108 is not disturbed until the bail reaches a predetermined position according to the bulk of the shock, when the rod 97 pulling upon the rod 100 rotates the cranked rod 102 to swing the yoke member 104 so that the rear lug end thereof will move up against the rod 105 and as the rod 105 moves forwardly by the swinging of the bell crank level 89, the rear end of said yoke moves behind the end of the rod, then as the rod moves backwardly it pushes on the yoke and pushes the link 108 upwardly causing the link 108 and yoke 104 to bend on their connecting pivot breaking the lock joint formed by said members and the bar 109 swings downwardly on the arc of the pivot of the arms 61 to the position shown in Figure 7. The skids are thus dropped close to the ground and the butt ends of the sheaves carried thereon will be engaged by the stubble projecting upwardly between the skid bars. The downward movement of the arms 61 pulls upon the rods 97 thereby throwing the bail upwardly to the position shown in Figure 7 so that it clears the heads of the sheaves.

In order to hold the shock from shaking apart as it is discharged, inwardly sloping side rods 111 are pivoted in brackets 112 supported from the rigid side bars 65 connected with the ends of the cross bar 7. The side arms 111 are spring held inwardly against the sheaves by coil springs 113.

In order to support the forward sheaves of the shock against dislodgement from the bundle during the discharge, I provide a pair of arms 114 which are adapted to swing horizontally to follow the sheaves off the skids. These are journalled in vertically arranged brackets 115 on the ends of the bars 65 and are offset adjacent to their cranked ends and are encircled at the offset by the eye ends of the rods 116, the upper ends of which are connected to the outer ends of the links 96. These rods being connected to the links 96 provide certain flexibility of action as against the downward movement of the rods 97 and prevent too positive a sweeping action as the sheaves are discharged.

In operating this machine, it is coupled to the discharge side of the binder in the manner described and as the sheaves are delivered from the binder deck they fall, butts to the front, upon the rotating carrier members which are continuously in operation. These push the sheaf into the open gripper and the sheaf engaging the trip arm swings it to release the latch arm from the keeper. The tension spring connected with the upper gripper member snaps said member around the sheaf, the shock being cushioned by a compression spring on the guide rod connected to the lower member and the supporting bail. The movement of the latch for releasing the gripper member simultaneously releases the clutch dog and the crank arm 55 through the connecting rod 54 swings the sheaf carrying bail rearwardly on its pivot in the frame. As the bail swings rearwardly the front tie bar rotates the whole of the sheaf carrying mechanism on the top of the bail so that the butt end of the sheaf swings downwardly while the head is carried upwardly without contact with any part of the machine.

Coincidently with the swinging of the bail the lever 89 journalled on the lower end of the bail is swung on its pivot by its connection with the crank arm and through the rod 88, yoke 87 and link rods 86, one or other of the bevel gears 78 is moved into mesh with one of the pinions on the constantly rotating cross shaft. The crank carried on the bevel gear carries the hook-shaped packer member forwardly and while said member is moving forwardly the mechanism for operating the sheaf carrying bail and gripper is arrested by the arm 91 engaging the clutch dog 52. The packer member is swung inwardly so that the hooked ends engage the forward side of the sheaf and pull it out of the gripper and carry it rearwardly on to the skids resting it on its butt and against the sheaf bail.

Immediately following the removal of the sheaf from the gripper the stop lug on the operating bevel gear 78 engages the bevelled portion 94 of the cranked bar 93 and through the connecting rod 92 moves the arm 91 to release the clutch dog. The crank arm then continues its movement and swings the gripper bail forwardly. In the forward swing of the gripper the latch arm 41 engages the rigid spur on the keeper 38 and slides into place in front of the keeper and in the recovery to the original position the link 42 pulls the upper member 36 upwardly against the tension of the spring 44. The gripper is then in position to receive the next sheaf.

This operation is repeated and through the operation of the rocking stop bar 84 the packer members operate alternately to take the sheaves from the gripper. The sheaves are packed into position on the skids guided by the shock bail and side spring guide bars until the pressure of the bulk of the sheaves swings the bail upwardly to operate the connecting parts which throw the yoke 104 into the rearward path of movement of the rod 105, then said rod effects the dropping of the skids and the raising of the shock bail with the rearward sweep of the arms 114 to deposit the shock, butt end upon the ground in a compact form, the machine moving forward and clearing the shock.

This action follows the delivery of the overbalancing sheaf to the sheaf receptacle and as the sheaf carrying bail swings rearwardly with the next sheaf the rod 105 engages the sleeve 106 and pulling forwardly upon the link 108 and bar 109 lifts the skids to their original position, simultaneously throwing the shock bail downwardly ready to receive the next sheaf from the gripper.

A machine such as described is very positive in its operation. The absolute timing of the various motions is obviated by the arrangement of lost motion devices described and a very light and easily handled mechanism is provided which effectively gathers the sheaves into bundles and deposits them as shocks, butt end upon the ground so that they will stand up effectively under the usual conditions. The machine is a complete mechanism which may be attached to any standard binder without change or addition other than a traction connection and an operating shaft connection.

What I claim as my invention is:

1. A grain shocker, means adapted to grip the sheaves as they are discharged from a binder, means for swinging said gripper means to turn the sheaf butt down, means for removing the sheaves from said gripper means, means for receiving the sheaves removed from the gripper, and means for depositing the sheaves in a shock butt ends on the ground.

2. In a grain shocker, a gripper supported horizontally to receive the sheaves discharged from a binder, means actuated by the sheaf for closing the gripper thereon, means for swinging said gripper from a horizontal to a vertical position, means for removing the sheaves from said gripper, means for receiving the sheaves removed from the gripper, and means for depositing the sheaves in a shock butt ends on the ground.

3. In a grain shocker, a shocker frame, a member supported on said frame adapted to swing in a vertical plane, a sheaf gripper pivotally mounted on said swinging member and opening toward the binder, means for swinging said gripper carrying member, means actuated by the sheaf for starting said swinging means into operation, means for removing the sheaves from said gripper, means for receiving the sheaves removed from the gripper, and means for depositing the sheaves in a shock butt ends on the ground.

4. In a grain shocker, a shocker frame, a member supported on said frame adapted to swing in a vertical plane, a member pivotally mounted on said swinging member to swing longitudinally of the frame, a tie rod connecting the latter swinging member with the frame, a sheaf gripper mounted transversely on the latter swinging member, means for swinging the vertical swinging member, means actuated by the sheaf for starting said swinging means into operation, means for removing the sheaves from said gripper, means for receiving the sheaves removed from the gripper, and means for depositing the sheaves in a shock butt ends on the ground.

5. In a grain shocker, a shocker frame, a member supported on said frame adapted to swing in a vertical plane, a member pivotally mounted on said swinging member to swing longitudinally of the frame, a tie rod connecting the latter swinging member with the frame, a pair of gripper members pivotally mounted in the latter swinging member and adapted to open toward the binder side of the frame, a latch adapted to hold the upper gripper member in a raised position, a spring exerting a downward pull on said upper gripper member against said latch, a trip arm extending between the gripper members adapted to disengage the latch and to release said gripper member to grip the sheaf, means for swinging the vertical swinging member following the gripping of the sheaf, means for removing the sheaves from said gripper, means for receiving the sheaves removed from the gripper, and means for depositing the sheaves in a shock butt ends on the ground.

6. In a grain shocker, a shocker frame, a bail pivoted transversely of the shocker frame, a sleeve pivotally mounted on said bail and having a rigid upward extension, a tie rod pivoted to said extension and extending forwardly and pivotally connected to the frame, a bar rigidly connected transversely of said sleeve, a pair of gripper members pivoted on said bar and opening toward the binder, a keeper rigid with the bail, a latch on said sleeve adapted to engage said keeper to hold the gripper open, a trip for releasing said latch, spring means for closing the gripper on the release of said latch, means for swinging the bail, means for arresting the swinging means, means connected with said latch for releasing the arresting means, means for removing the sheaf from the gripper, means for receiving the sheaves, and means for depositing the shock on the ground.

7. In a grain shocker, a shocker frame, a bail pivoted transversely of the shocker frame, a sleeve pivotally mounted on said bail, means for swinging said sleeve on said bail, a pair of gripper members pivoted transversely of said sleeve and extending toward the binder, means for closing the gripper members on the sheaf, means for swinging the bail, means connected with the gripper below its pivot and connected with the bail adapted to swing the gripper to a position central of the frame upon the backward swinging of the bail, means for removing the sheaf from the gripper, means for forming a shock, and means for depositing the shock on the ground.

8. In a grain shocker, a shocker frame, a constantly operating carrier member arranged on the inward side of the shocker frame adapted to receive the sheaves discharged from the binder, a gripper member adapted to receive the sheaves from said carrier, means for operating said gripper member to turn the sheaves butt down, means for removing the sheaves from said gripper member, means for forming a shock, and means for depositing the shock butt ends on the ground.

9. In a grain shocker, a shocker frame, a shaft supported from the shocker frame in a position adjacent to the binder deck and parallel therewith, a plurality of cross arms extending transversely of and secured to said shaft and forming sheaf carriers, means for constantly rotating said shaft operated from the binder machine, a gripper supported substantially horizontally to receive the sheaves discharged from the carrier, means for operating said gripper to grip the sheaves, means for operating said gripper to swing the sheaves into a vertical position butts down, means for removing the sheaves from said gripper, means for forming a shock, and means for depositing the shock butt ends on the ground.

10. In a grain shocker, a shocker frame, a power shaft journalled in said frame and flexibly connected with the binder mechanism and operated therefrom, a swinging member supported on the frame, a sheaf gripper carried on said swinging member adapted on the swinging of said member to carry a sheaf backwardly and swing it to a vertical position, a clutch operated from said power shaft, a crank operated by said clutch, a connecting rod connecting said crank and said swinging member, means for holding the clutch out of gear with the constantly operating shaft, means actuated by the operation of the gripper for throwing said clutch into gear to effect the swinging of said swinging member, means for removing the sheaves from the gripper, means for forming a shock, and means for depositing the shock butt ends on the ground.

11. In a grain shocker, a shocker frame, a power shaft journalled in said frame, a swinging member supported on the frame, a sheaf gripper carried on said swinging member adapted on the swinging of said member to carry a sheaf backwardly and swing it to a vertical position, a clutch operated from said power shaft, a crank operated by said clutch, a connecting rod connecting said crank and said swinging member, a release dog on said clutch, a trip arm adapted to engage said dog and hold the clutch out of gear with the shaft, means actuated by the sheaf for operating the sheaf gripper, means operated by the operation of the sheaf gripper for operating said trip arm to release the clutch dog, means for removing the sheaf from the gripper, means for receiving the sheaves, and forming a shock, and means for depositing the shock on the ground.

12. In a grain shocker, a shocker frame, a power shaft journalled in said frame, a swinging member supported on the frame, a sheaf gripper carried on said swinging member adapted on the swinging of said member to carry a sheaf backwardly and swing it to a vertical position, a clutch operated from said power shaft, a crank operated by said clutch, a connecting rod connecting said crank and said swinging member, means actuated by the sheaf for operating said clutch, packer members carried on either side of the frame adapted to remove the sheaves from the gripper member and to carry them rearwardly, means for receiving the sheaves and forming a shock, and means for discharging the shock from said receiver.

13. In a grain shocker, a shocker frame, a sheaf gripper supported from said frame and adapted to carry a sheaf backwardly to a vertical position, rotatable members supported on the frame at either side, packer members supported by said rotatable members and adapted to swing into the path of the gripper member and to take the sheaf therefrom, means for effecting the operation of the rotatable members carrying the packer members, means for receiving the sheaves from the packer members and forming a shock, and means for discharging the shock from said receiving means.

14. In a grain shocker, a shocker frame, a sheaf gripper adapted to carry a sheaf backwardly and swing it to a vertical position, rotatable members supported on the frame at either side, packer members supported by said rotatable members and adapted to swing into the path of the gripper member and to take the sheaf therefrom, a constantly operated gear shaft, means for shifting said rotatable members into operating engagement with said gear shaft, means for restraining one or other of said rotatable members from being brought into operating engagement with said gear shaft, means for receiving the sheaves and forming a shock, and means for discharging the shock.

15. In a grain shocker, a shocker frame, a sheaf gripper adapted to carry a sheaf backwardly and swing it to a vertical position, rotatable members supported on the frame at either side, packer members supported by said rotatable members and adapted to swing into the path of the gripper member and to take the sheaf therefrom, a constantly operated gear shaft, means for shifting said rotatable members into operating engagement with said gear shaft, means for restraining one or other of said rotatable members from being brought into operating engagement with said gear shaft, means for locking the inoperative rotatable member during the operation of its companion member, means for receiving the sheaves from the packer members and forming a shock, and means for discharging the shock.

16. In a grain shocker, a shocker frame, a sheaf gripper adapted to carry a sheaf backwardly and swing it to a vertical position, rotatable members supported on the frame at either side, packer members supported by said rotatable members and adapted to swing into the path of the gripper member and to take the sheaf therefrom, a constantly operated gear shaft, means for shifting said rotatable members into operating engagement with said gear shaft, means for restraining one or other of said rotatable members from being brought into operating engagement with said gear shaft, a notched flange on each of said rotatable members, members fixed on the frame adapted to enter the notch of the inoperative rotatable member, means for receiving the sheaves from said packer members and forming a shock, and means for discharging the shock.

17. In a shocker machine, a frame, a swingable member carried on the front of the frame, a sheaf gripping member supported on said swingable member and adapted to swing thereon, a power shaft journalled in the frame, a crank operated from said shaft, a connecting rod connecting said crank with said swingable member, a bell crank lever pivoted on the forward end of the frame having one end operatively connected with the crank, a rod extending rearwardly from the other end of the bell crank, a pair of rods extending one from either side of the latter rod, a pair of gear brackets slidably arranged in the frame and each connected with one of the aforesaid pair of rods and adapted to be moved laterally of the frame, a member pivoted on the frame adapted to intercept either one or other of said brackets to prevent its transverse movement, a gear shaft constantly rotated and having pinions fixed thereon, gear wheels mounted in said brackets adapted to be moved into mesh with said pinions on the shifting of said brackets, crank members carried by said gears and operating horizontally, packer members carried by said crank members adapted to remove the sheaves from the sheaf gripper, means for receiving the sheaves and forming a shock, and means for discharging the shock.

18. In a shocker machine, a frame, a swingable member carried on the front of the frame, a sheaf gripping member supported on said swingable member and adapted to swing thereon, a power shaft journalled in the frame, a crank operated from said shaft, a connecting rod connecting said crank with said swingable member, a bell crank lever pivoted on the forward end of the frame having one end operatively connected with the crank, a rod extending rearwardly from the other end of the bell crank, a yoke slidable on said rod, compression springs encircling said rod at the front and back end of said yoke, rods pivoted one at each side of said yoke, a pair of brackets slidably supported one at each side of the frame and each connected with one of the yoke rods, means for intercepting either one of said brackets, a gear shaft constantly rotated, gear wheels mounted on said brackets adapted to engage said gear shaft on the inward movement of the brackets, crank members carried by said gear wheels and operating horizontally, packer members pivotally supported from the frame and connected with said crank members and adapted to remove the sheaves from the sheaf gripper, means for receiving the sheaves and forming a shock, and means for discharging the shock.

19. In a grain shocker, a shocker frame, a sheaf gripper adapted to carry a sheaf backwardly and swing it to a vertical position, rotatable members supported on the frame at either side, crank members extending upwardly from said rotatable members, horizontally swinging members supported each side of the frame, hook shaped packer arms supported at the rear ends from said horizontally swinging members and supported at the forward ends on said crank members, means for alternately operating said crank members, means for receiving the sheaves taken from the gripper by said packer arms, and forming a shock and means for delivering the shock.

20. In a shocker machine, a frame, a swingable member carried on the front of the frame, a sheaf gripping member supported on said swingable member and adapted to swing thereon, a power shaft journalled in the frame, a clutch operated from said shaft, a crank arm carried by said clutch, a release dog carried by said clutch, a trip arm actuated by the sheaf adapted to release said dog, a sheaf receptacle, packer members adapted to move forwardly and backwardly to remove the sheaf from the sheaf gripping member, a trip arm adapted to intercept the clutch dog supported on the drive shaft to arrest the movement of the swingable member during the forward movement of the packer members, and means for discharging the sheaves from the receptacle.

21. In a shocker machine, means for carrying the sheaves rearwardly and depositing them in a vertical position, a plurality of longitudinally arranged skid bars spaced apart and pivotally suspended from the forward end from said frame and extending rearwardly in a substantially horizontal position, means for forming the sheaves into a shock with their butts resting on said skids, means for lowering rear ends of said skids by swinging upon said pivotal suspension to deposit the shock on the ground, means for raising said skids following the delivery of the shock, and means for holding said skids in the raised position during the forming of the shock.

22. In a shocker machine, means for carrying the sheaves rearwardly and depositing them in a vertical position, a plurality of longitudinally arranged skid bars spaced apart and pivotally suspended at their forward ends from said frame, a pivotal support for said skid bars intermediate of their length, means for holding said pivotal support in a raised position, means for releasing said holding means, and means operated by the sheaf carrying member for returning said skids to their raised position.

23. In a shocker machine, means for carrying the sheaves rearwardly and depositing them in a vertical position, a plurality of longitudinally arranged skid bars spaced apart and pivotally suspended at their forward ends, a bar extending across and supporting said skids intermediate of their length, arms connected to the ends of said bar and pivotally suspended from the frame, an arm secured to said cross bar, links jointed together and connected to the latter arm and to the frame and forming a break joint lock to hold the skids in the raised position, means for releasing said lock actuated by the sheaves deposited on the skids, means for swinging the pivotal arms supporting said skids downwardly and upwardly, means for holding the sheaves on the skids, and means actuated by the lowering of the skids for removing said holding means.

24. In a shocker machine, means for carrying the sheaves rearwardly and depositing them in a vertical position, a plurality of longitudinally arranged skid bars spaced apart and pivotally suspended at their forward ends, a bar extending across and connected to said skids intermediate of their length, arms connected to the ends of said bar and pivotally suspended from the frame, an arm connected to said cross bar, links jointed together and connected to said latter arm, a link connected to the forward end of the aforesaid links and forming a break joint lock to hold the skids in the raised position, a bell crank lever connected with the break joint of said links, means actuated by the sheaves deposited on the skids for operating said bell crank lever adapted to push said links rearwardly to lower the skids and to pull on said links and arm to raise the skids.

25. In a shocker machine, means for carrying the sheaves rearwardly and depositing them in a vertical position, a plurality of longitudinally arranged skid bars pivotally suspended at the forward end from said frame, a bar extending across and connected to said skids intermediate of their length, arms connected to the ends of said bar and pivotally suspended from the frame, an arm connected to said cross bar, a link jointed to the forward end of the latter arm, a pair of links connecting the latter link to the frame, a yoke-shaped link pivoted at the point of connection of the aforesaid links, a rod sliding through the forward end of said yoke, a lever connected with the forward end of said rod and operatively connected with the sheaf carrying means, a bell crank lever connected with the rear end of said yoke and adapted to move it into and out of engagement with the end of said sliding rod, and means actuated by the sheaves deposited on the skids for operating said bell crank lever.

26. In a shocker machine, means for carrying the sheaves rearwardly and depositing them in a vertical position, a plurality of longitudinally arranged skid bars spaced apart and pivotally suspended at the forward end from the frame, means for raising and lowering the rear ends of said skids, means for holding said skids in a raised position, a shock forming bail pivotally supported above said skids and with said skids forming a shock former, rods pivotally connecting the skids with said bail, means connected with said rods for releasing said skid holding means, and means connected with the sheaf carrying member for lowering said skids and returning them to their raised position.

27. In a shocker machine, means for carrying the sheaves rearwardly and depositing them in a vertical position, a plurality of longitudinally arranged skid bars pivotally suspended at their forward ends from the frame, a pivotal support for said skid bars intermediate of their length, means connected with the rear pivotal supports of said skids for lowering and raising same, a bell crank lever for actuating the lowering and raising means pivotally supported from the frame, a shock forming bail pivotally mounted above said skids and having cranked extensions, rods connecting the cranked extensions of said bail with the rear pivotal support members of the skids, and a rod connecting one of the aforesaid rods with the bell crank lever to operate same upon the swinging of the bail.

28. In a shocker machine, means for carrying the sheaves rearwardly and depositing them in a vertical position, skids pivotally suspended at the forward end from the frame and adapted to be raised and lowered at the rear end, a shock forming bail pivotally mounted above said skids and having crank ends, rods connected with said crank ends and with said skids, horizontally swinging arms supported from the frame adapted to engage the forward sides of the shock, and rods connected with the crank ends of the bail and with said arms for swinging the arms to follow the shock as it is discharged.

29. In a shocker machine, means for carrying the sheaves rearwardly and depositing them in a vertical position, skids pivotally suspended at the forward end from the frame and adapted to be raised and lowered at the rear end, a shock forming bail pivotally mounted above said skids, means operated by said bail for lowering the skids, arms pivotally supported from the frame and spring held against the sides of the sheaves forming the shock, and means for raising the skids following the delivery of the shock.

30. In a shocker machine, a rigid frame, wheels supporting the rear of said frame, pivotal axles carrying said wheels, a trussed bar pivotally mounted on the inner axle and having a spade end adapted to dig into the ground to swing the upper end forward or rearward of the vertical pivot of said axle, a tie rod connected to the upper end of said trussed bar and adapted to be connected to a binder machine, and means carried on said frame for forming and discharging the shock.

HERBERT FOX.